United States Patent
Kobayashi et al.

(10) Patent No.: US 6,295,390 B1
(45) Date of Patent: *Sep. 25, 2001

(54) IMAGE INPUT/OUTPUT APPARATUS WITH LIGHT ILLUMINATION DEVICE FOR TWO-DIMENSIONAL ILLUMINATION

(75) Inventors: Isao Kobayashi, Atsugi; Hidemasa Mizutani, Sagamihara; Noriyuki Kaifu, Hachioji; Shinichi Takeda, Atsugi; Masakazu Morishita, Hiratsuka, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/512,699

(22) Filed: Aug. 8, 1995

(30) Foreign Application Priority Data

| Aug. 23, 1994 | (JP) | 6-198281 |
| Aug. 23, 1994 | (JP) | 6-198284 |
| Aug. 2, 1995 | (JP) | 7-197184 |

(51) Int. Cl.[7] ............................ G06K 9/22; H04N 1/024; H04N 1/04
(52) U.S. Cl. ............................ 382/313; 358/473; 358/474
(58) Field of Search ........................... 358/473, 474, 358/475, 482, 483, 484; 382/313–315; 250/208.1; 257/59, 72, 290, 291, 350; 349/45–47, 63–64, 112

(56) References Cited

U.S. PATENT DOCUMENTS

| 3,993,865 | * | 11/1976 | Browne et al. | 358/473 |
| 4,523,235 | * | 6/1985 | Rajchman | 358/473 |
| 4,534,622 |   | 8/1985 | Harada et al. | 350/334 |
| 4,716,300 | * | 12/1987 | Andrich | 358/474 |
| 4,745,488 |   | 5/1988 | Kaifu et al. | 358/294 |

(List continued on next page.)

FOREIGN PATENT DOCUMENTS

| 0117957 |   | 9/1984 | (EP) . |
| 59158553 |   | 9/1984 | (JP) . |
| 62198155 |   | 9/1987 | (JP) . |
| 1113263 | * | 5/1989 | (JP) . |
| 4-80791 |   | 3/1992 | (JP) . |
| 4282609 |   | 10/1992 | (JP) . |
| 05-002162 |   | 1/1993 | (JP) . |
| 5-90557 |   | 4/1993 | (JP) . |
| 5244346 |   | 9/1993 | (JP) . |
| 6152867 | * | 5/1994 | (JP) . |

OTHER PUBLICATIONS

Patent Abstracts of Japan, vol. 13, No. 383 (E–811), Aug. 24, 1989 & JP–A–01 132263 (Sanyo Electric Co Ltd), May 24, 1989, * abstract*.

Patent Abstracts of Japan, vol. 18, No. 467 (E–1599), Aug. 30, 1994 & JP–A–06 152867 (Nisca Corp), May 31, 1994, * abstract *.

Technical Digest (At & T Technologies), No. 77, Oct. 31, 1985, Berkeley Heights (US), p. 17 XP002001138 J.S. Courtney–Pratt: "Plate device for scanning and displaying graphics" * the whole document *.

Primary Examiner—Madeleine Nguyen
(74) Attorney, Agent, or Firm—Fitzpatrick, Cella, Harper & Scinto

(57) ABSTRACT

A two-dimensional image input unit is disposed on one surface, and data processed by an image processing circuit for processing an image input by the image input unit can be displayed on a two-dimensional image output unit disposed on the other surface as a rear surface with respect to the one surface. Size and cost reductions of the entire apparatus are attained, and read image information can be displayed on the image output surface as the upper surface in real time.

7 Claims, 12 Drawing Sheets

U.S. PATENT DOCUMENTS

| | | | |
|---|---|---|---|
| 4,890,230 | * 12/1989 | Tanoshima et al. | 382/313 |
| 4,922,111 | * 5/1990 | Kuwano et al. | 382/313 |
| 4,926,058 | 5/1990 | Iwamoto et al. | 250/578.1 |
| 5,033,823 | * 7/1991 | Shannon . | |
| 5,060,040 | 10/1991 | Saika et al. | 357/30 |
| 5,125,046 | 6/1992 | Siwoff | 382/54 |
| 5,233,442 | 8/1993 | Kawai et al. | 358/482 |
| 5,272,548 | 12/1993 | Kawai et al. | 358/482 |
| 5,278,673 | * 1/1994 | Scapa et al. | 358/473 |
| 5,313,055 | * 5/1994 | Shiratsuki et al. | 250/208.1 |
| 5,317,406 | * 5/1994 | Kobayashi | 358/482 |
| 5,327,503 | * 7/1994 | Kiyohara | 382/313 |
| 5,335,094 | 8/1994 | Kaifu et al. | 358/494 |
| 5,550,938 | * 8/1996 | Hayakawa et al. | 382/313 |
| 5,748,228 | * 5/1998 | Kobayashi et al. | 382/315 |

* cited by examiner

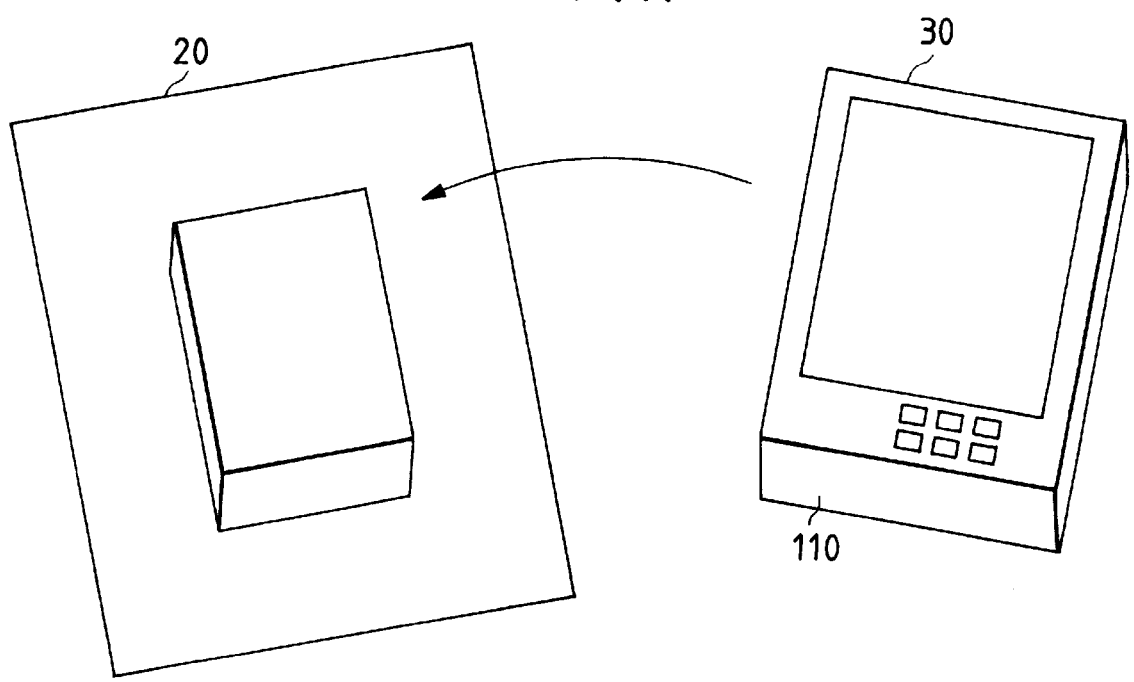
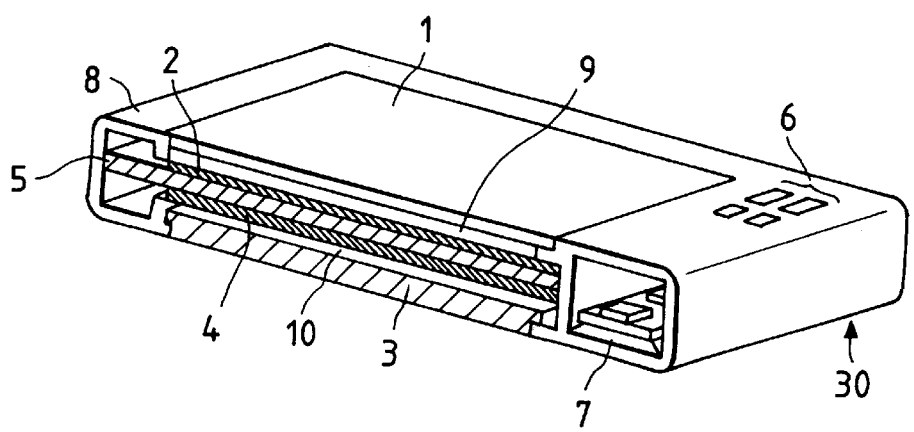

IMAGE INPUT/OUTPUT APPARATUS WITH LIGHT ILLUMINATION DEVICE FOR TWO-DIMENSIONAL ILLUMINATION

BACKGROUND OF THE INVENTION

1. Field of the Invention

The present invention relates to an image input/output apparatus and, more particularly, to an image input/output apparatus which can attain two-dimensional image input (reading) and output (display) operations.

2. Related Background Art

As a conventional portable image input/output apparatus, a combination of an image input device such as a one-dimensional hand scanner, a one-dimensional image reader, or the like, and an image output device such as a liquid crystal display is popularly used. However, in such a portable image input/output apparatus, a user who operates a one-dimensional image input unit as an image input device must manually move the image input unit along an original, or an original must be mechanically scanned relative to the image input unit.

However, when a manual scanning operation is performed, the scanning speed of the image input unit relative to the original is often improper or nonuniform, and a reading error often occurs, resulting in poor operability. When a mechanical scanning operation is performed, although a proper and constant scanning speed can be obtained, the scanning device becomes large in size, and the consumption power increases. In either case, since the scanner is required in addition to the display device, problems associated with a complicated structure and high cost as a portable apparatus, and a problem associated with portability remain unsolved.

Under these circumstances, a method of performing an original reading operation and an image display operation by utilizing a two-dimensional image input device and an image output device such as a two-dimensional liquid crystal display has been proposed.

For example, Japanese Laid-Open Patent Application No. 4-282609 describes input/output integrated information processing equipment, in which an image input unit having an image sensor formed on a first transparent substrate, and an image output unit having a second transparent substrate formed with TFTs and transparent driving electrodes, color filters, and a liquid crystal are integrally stacked. This patent application also describes input of desired information by utilizing reflection of light at a pen tip, or using a pen having a light source in its pen tip.

Japanese Laid-Open Patent Application No. 5-244346 describes an image processing apparatus in which a display device constituted by a liquid crystal display as an image output unit and a backlight is arranged on the rear surface of an image input unit comprising an amorphous silicon array two-dimensional optical sensor as reading means, and light emitted by the backlight is used in an image reading operation.

In addition, since each of these apparatuses has a single image input/output surface, as shown in FIG. 1, an apparatus 30 must be reversed to face down and placed on an original 20 to read the original 20. Furthermore, in order to display the read image and visually observe the displayed image, the apparatus 30 must be reversed to face up, so that an image input/output surface 110 can be visually observed.

Even when an original reading operation is performed by reversing an original to face down and placing it on the image input/output surface of the apparatus without reversing the apparatus to face down, an operator must remove the read original from the surface of the apparatus so as to display the read image and visually observe the displayed image.

In this manner, when a single surface serves as both image input and output surfaces, the entire image input apparatus must be reversed to face up or down every time image input and output operations are performed.

When a region to be read of, e.g., an original is equal to or almost equal to the input region of the image input unit, since the entire apparatus is reversed to face down, it is difficult to set the region to be read to fall within the input region. As a result, the input and display operations must be alternately repeated to confirm the input image.

Furthermore, when a region to be read of, e.g., an original has a low contrast or a low chromatic contrast, confirmation of the read information must often be required similarly. In this case, the operation for reversing the entire apparatus must also be repeated until an optimal input is attained.

SUMMARY OF THE INVENTION

It is an object of the present invention to provide an image input/output apparatus which can attain size and cost reductions of the entire apparatus.

It is another object of the present invention to provide an image input/output apparatus which can read an image while confirming image information read by an image input unit or image information to be read on an original.

It is still another object of the present invention to provide an image input/output apparatus which can display image information read by an image input unit on an image output unit in real time.

It is still another object of the present invention to provide an image input/output apparatus which has remarkably improved operability as compared to a conventional apparatus.

It is still another object of the present invention to provide an image input/output apparatus which has a so-called electronic loupe function for displaying the read image in an enlarged scale.

It is still another object of the present invention to provide an image input/output apparatus which can attain size and cost reductions of the entire apparatus since a two-dimensional image input unit (reading means) is disposed on one surface, and a two-dimensional image output unit (display means) is disposed on the other surface as a rear surface with respect to the one surface, and which can be placed on an original with an image input surface facing down and an image output surface facing up, and can display read image information on the image output surface that faces up since the image input and output surfaces are different from each other, thus greatly improving operability.

It is still another object of the present invention to provide an image input/output apparatus which comprises a two-dimensional image input unit disposed on one surface, an image processing circuit for processing an image input by the image input unit, and a two-dimensional image output unit disposed on the other surface opposite to the one surface.

BRIEF DESCRIPTION OF THE DRAWINGS

FIG. 1 is a perspective view for explaining a conventional image input/output apparatus and the principle of its use;

FIGS. 2 and 10 are respectively partially cutaway perspective views for explaining the preferred embodiments of the present invention;

DETAILED DESCRIPTION OF THE PREFERRED EMBODIMENTS

The preferred embodiments of the present invention will be described hereinafter with reference to the accompanying drawings.

[First Embodiment]

Figure 3A:
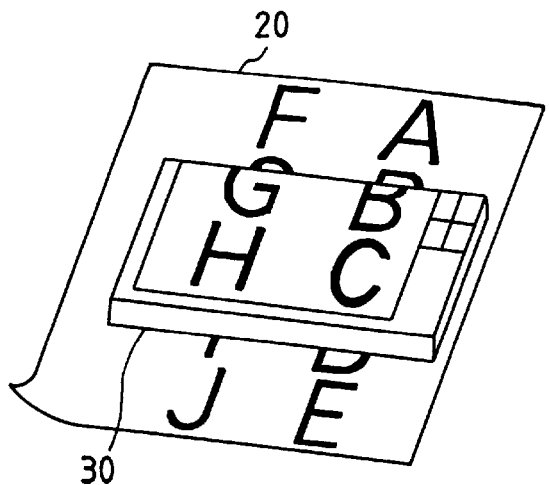
FIGS. 3A to 3C and FIGS. 5A and 5B are perspective views for explaining the driving state of an image input/output apparatus of the present invention.
Figure 3B:
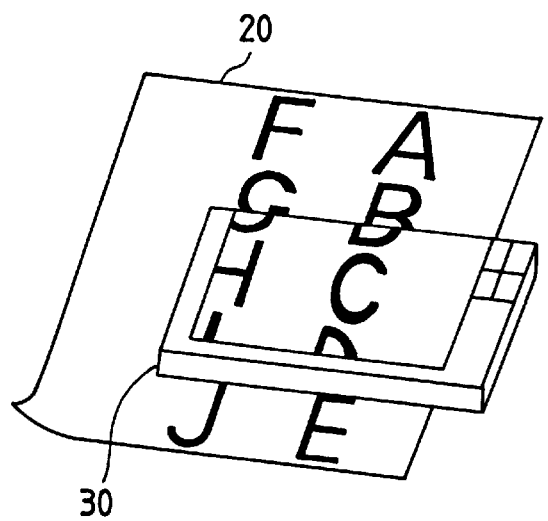
Figure 3C:
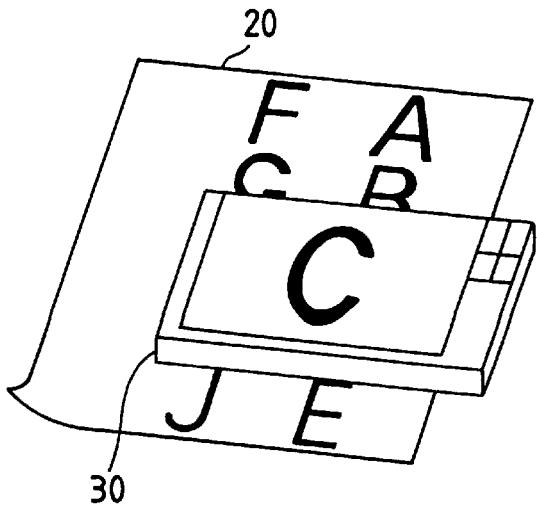

FIG. 2 is a partially cutaway perspective view of an image input/output apparatus according to the first embodiment of the present invention, and FIGS. 3A to 3C are perspective views showing the states of an original and the image input/output apparatus in an original reading state.

In an image input/output apparatus 30 of this embodiment shown in FIG. 2, an image output unit 1 such as a liquid crystal display is disposed facing up in FIG. 2 on the upper surface of the apparatus, and a backlight 2 for illuminating the liquid crystal display from the back surface side is disposed on the back surface of the image output unit 1. On the lower surface of the apparatus, an image input unit 3 such as a two-dimensional image sensor which is constituted by forming an amorphous silicon sensor on a transparent substrate is disposed facing down in FIG. 2. A reading light source 4 for illuminating an original surface via portions between adjacent ones of amorphous silicon sensor elements is disposed on the back surface of the image input unit 3.

Spaces are respectively formed between the image output unit 1 and the backlight 2, and between the image input unit 3 and the reading light source 4. Note that these spaces are formed to uniformly guide light beams from the respective light sources. If sufficiently uniform illumination is attained, these spaces may be omitted, or light guide members may be arranged to attain further uniform illumination, as needed.

The backlight 2 and the reading light source 4 are attached to a partition portion 5 extending from a housing 8 to separate the image output unit 1 side and the image input unit 3 side from each other. However, the partition portion 5 is not always necessary.

The image input/output apparatus 30 has a keyboard portion 6, at which the power switch of the apparatus 30 can be turned on/off, and respective functions for the reading and display operations can be selected and executed. A circuit portion 7 is arranged in the apparatus 30. When the apparatus 30 has a power supply such as a battery, the circuit portion 7 includes an image processing unit, a memory, and a controller including an IC for drive-controlling the respective functions or units, which are driven by utilizing the power supply.

Of course, the power supply may be supplied from an external device, and a voltage adjustment circuit may be arranged as needed.

On the other hand, the apparatus 30 may be driven by not only an instruction from the keyboard portion 6 but also a command from an external apparatus such as a computer. In response to instructions from the keyboard portion 6 or external commands, required display operations such as enlargement/reduction, movement, contrast change, color change, and reversal of a read and displayed image can be realized, and the display and reading conditions can be changed or switched.

As the light sources of the backlight 2 and the reading light source 4, a solid-state light-emitting device such as an LED, EL, or the like, a discharge tube such as a fluorescent lamp, xenon discharge tube, or the like, or various other light sources such as a halogen lamp, may be used. These light sources are appropriately selected depending on the size and weight of the apparatus 30 and the required brightness of the light sources.

For example, when the backlight 2 comprises a discharge tube, and the reading light source 4 comprises an LED, the backlight 2 can receive a power supply voltage from an illumination light source having, e.g., an inverter circuit, and the reading light source 4 can receive a power supply voltage from a DC power supply.

The state, during the driving operation, of the image input/output apparatus will be described below with reference to FIGS. 3A to 3C.

FIG. 3A shows a state wherein an image (characters in this case) written on an original 20 is read by the image input unit 3 having a two-dimensional image sensor on one surface (lower surface) of the image input/output apparatus 30, and at the same time, the read information is displayed on the image output unit 1 having a display on the other surface (upper surface) of the image input/output apparatus 30.

FIG. 3B explains the same state as that shown in FIG. 3A. As shown in FIG. 3B, the displayed contents change by moving the image input/output apparatus 30 relative to the original 20.

FIG. 3C shows a state wherein information read by the image input unit 3 is displayed in an enlarged scale on the image output unit 1 upon operation of, e.g., the keyboard portion 6. This state corresponds to an electronic loupe (i.e., a loupe for enlarging an image not optically but electrically) state since an image on the original 20 is displayed in an enlarged scale. In this mode as well, the displayed image normally changes by moving the image input/output apparatus 30 relative to the original 20.

Figure 4:
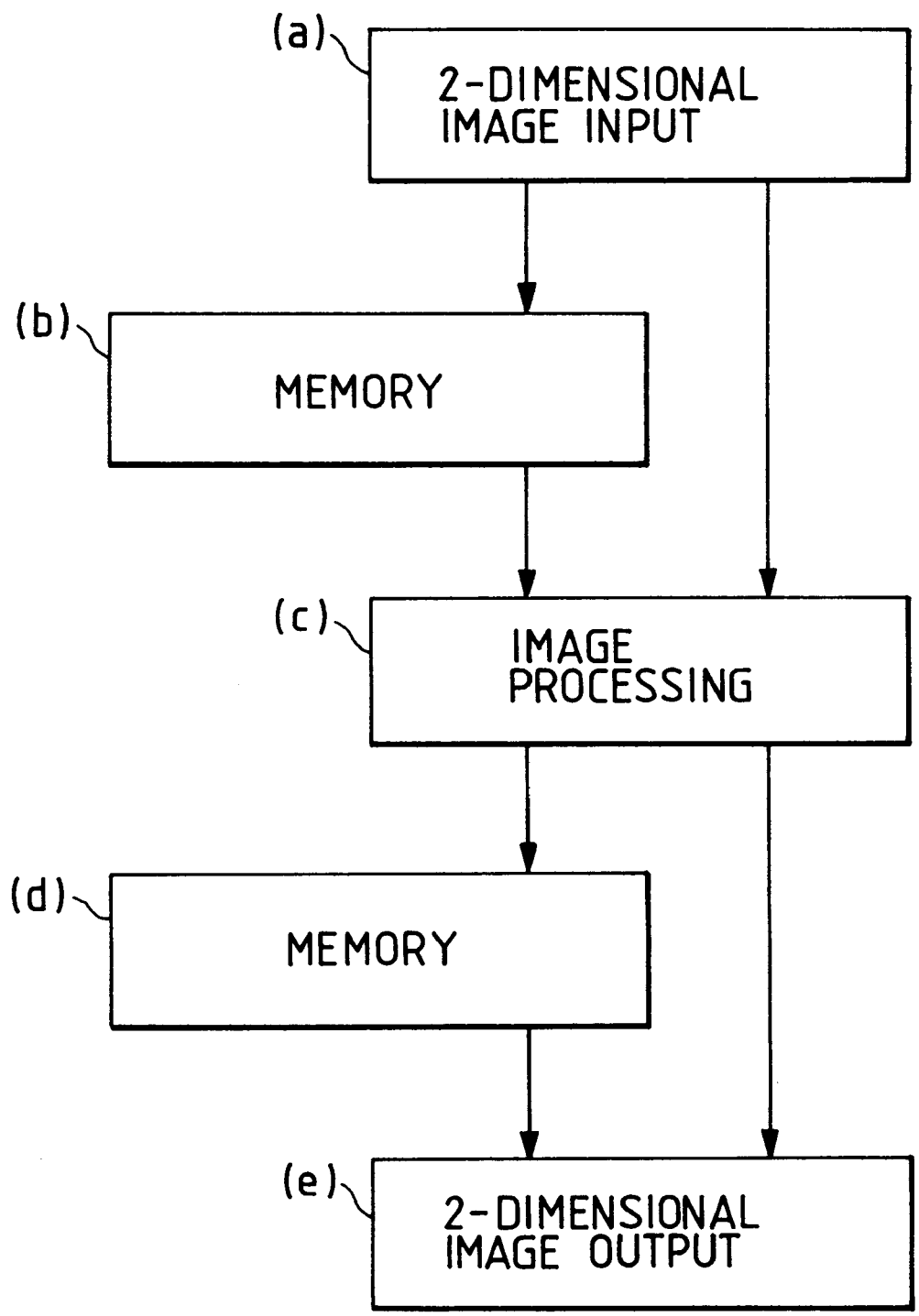
FIG. 4 is a flow chart for explaining an example of the flow that can be applied to the present invention.

A use example will be described in more detail below with reference to FIGS. 3A to 3C and FIG. 4. FIG. 4 is a flow chart that can be applied to the image input/output apparatus of this embodiment.

The image input/output apparatus 30 is placed on the original 20 to be read. A power switch 8 is turned on, and a "reading" key on the keyboard portion 6 is depressed. FIG. 3A shows the state at this time.

The position of the image input/output apparatus 30 is finely adjusted to the position of a character to be displayed in an enlarged scale.

FIG. 3B shows this state. In FIG. 3B, the position of the apparatus is adjusted to that of a letter "C".

Then, an "enlargement" key on the keyboard portion 6 is depressed once. In response to this operation, the letter "C" displayed on the image output unit 1 is displayed in a ×2 scale. FIG. 3C shows this state.

Such a series of operations of FIG. 3A→FIG. 3B→FIG. 3C can be expressed by the flow of a two-dimensional image input operation (a)→image processing "enlargement" (c)→a two-dimensional image output operation (e) in the flow chart in FIG. 4.

Figure 5A:
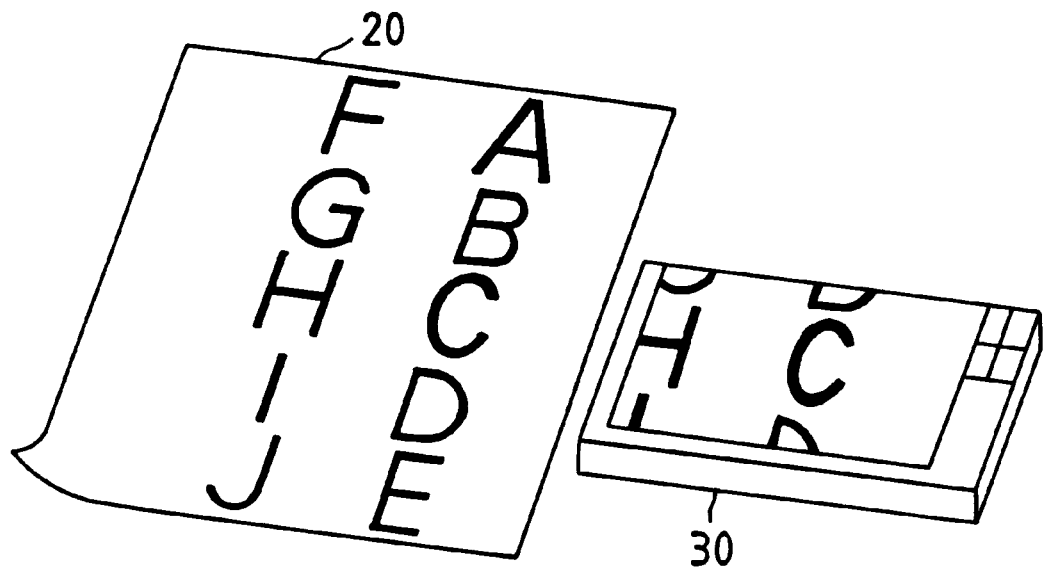
Figure 5B:
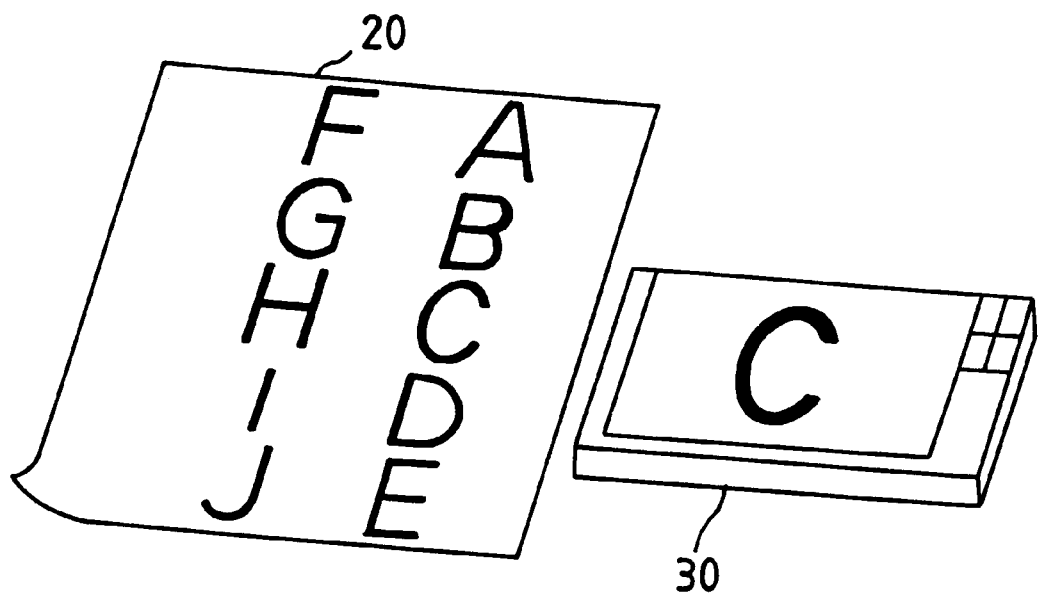

The operation of the apparatus of this embodiment will be further described with reference to FIGS. 5A and 5B. FIGS. 5A and 5B are perspective views.

A case will be exemplified below wherein the electronic loupe function is applied to a still image, i.e., a read image is temporarily stored in a memory, is subjected to image processing, and the processed image is displayed on the image output unit 1 again.

As in a case wherein the electronic loupe function is applied to a dynamic image, the power switch is turned on, the "reading" key on the keyboard portion 6 is depressed, and the position of the apparatus on the original is finely adjusted. The state at this time corresponds to FIG. 3B, and the position of the image input/output apparatus is adjusted to that of the letter "C".

Then, a "memory" key on the keyboard portion 6 is depressed. The read image is then stored in the memory. In this state, a "memory display" key on the keyboard portion 6 is depressed. With this operation, the image stored in the memory is displayed on the image output unit 1. FIG. 5A shows the state at this time.

In the state shown in FIG. 5A, the "enlargement" key on the keyboard portion 6 is depressed. In response to this operation, the letter "C" displayed on the image output unit 1 is displayed in a ×2 scale. FIG. 5B shows the state at this time. In this state, the "memory" key on the keyboard portion 6 is depressed again. Since the enlarged letter "C" is stored in the memory even after the power switch is turned off, it can be re-displayed after the power switch is turned on again.

Such a series of operations of FIG. 3A→FIG. 5A→FIG. 5B can be expressed by the flow of a two-dimensional image input operation (a)→memory (b)→image processing "enlargement" (c)→memory (d)→a two-dimensional image output operation (e) in the flow chart in FIG. 4.

The image processing "enlargement" in step (c) shown in FIG. 4 will be described below.

Figure 6:
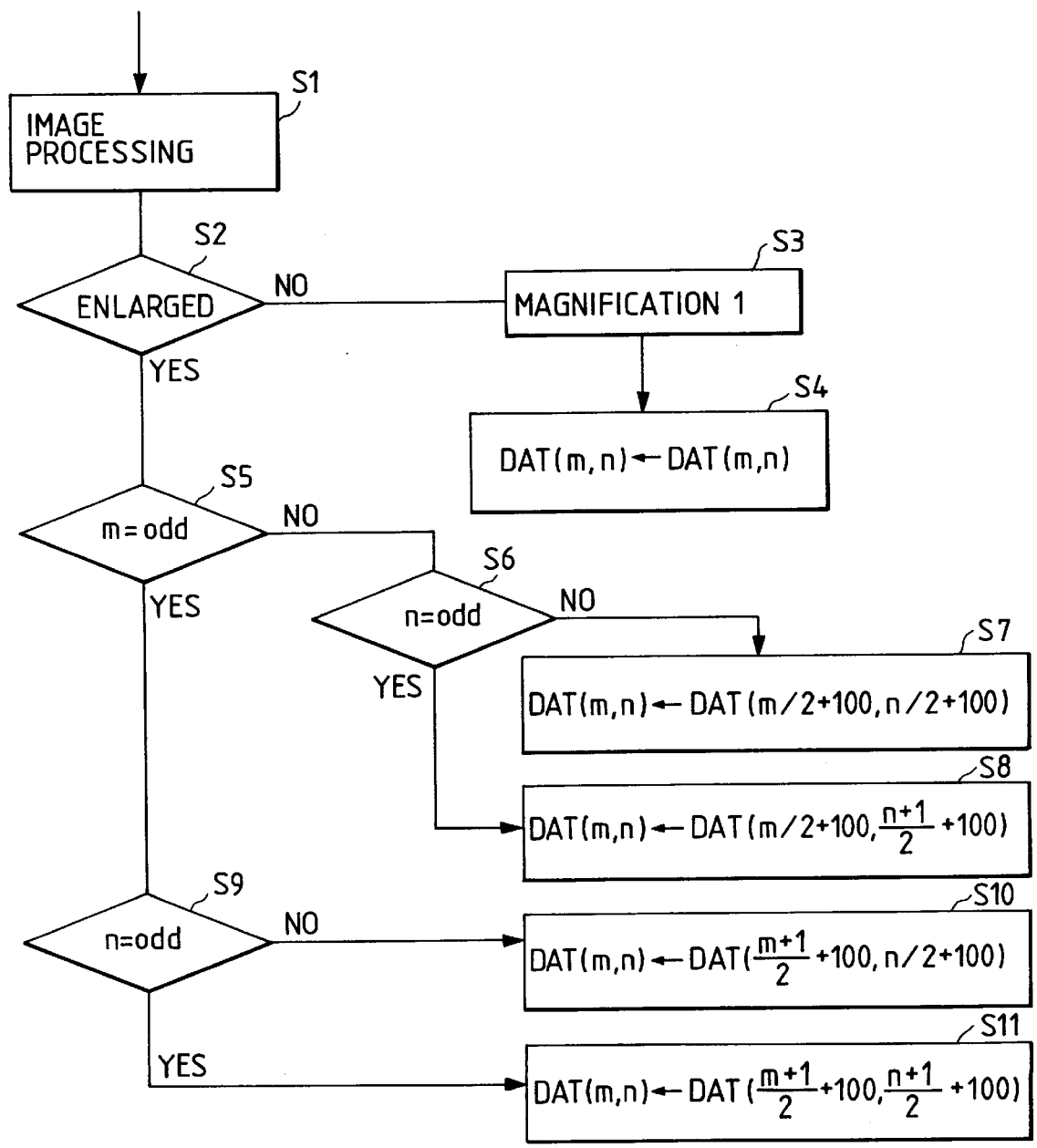
FIG. 6 is a flow chart for explaining an example of image processing that can be applied to the present invention.
Figure 7:
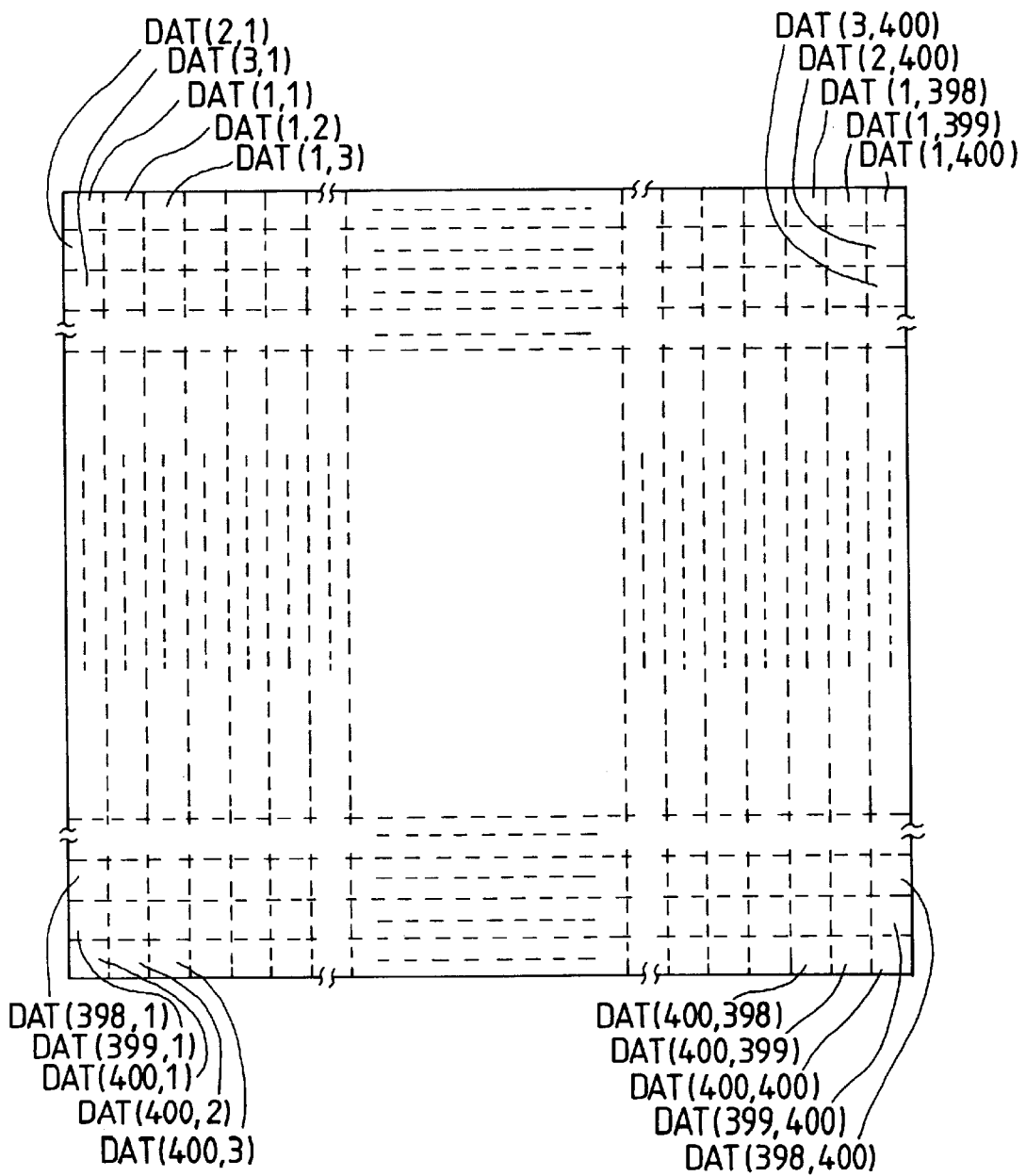
FIG. 7 is a view for explaining an example of data in a memory.

FIG. 6 is a flow chart showing the image processing "enlargement". In the following description, a case will be exemplified wherein 400×400 pixels are two-dimensionally arranged on the image input and output units at a density of 5×5 pixels per 1-mm² square, and 400×400 data (i.e., DAT(1, 1) to DAT(400, 400) are stored in the memory for storing image data, as shown in FIG. 7.

In FIG. 6, when the apparatus of this embodiment is used as an electronic loupe, i.e., when the "enlargement" switch is depressed, the 400×400 data in the memory are changed on the basis of the flow chart in FIG. 6.

More specifically, when the equal-magnification display mode is selected, since no enlargement is performed in the image processing (S1), NO is determined in the enlargement discrimination step (S2), and equal-magnification processing is selected (S3). Then, the input data is used as output data (S4).

When the enlargement display mode is selected (to be enlarged to a ×2 scale), since YES is determined in the enlargement discrimination step (S2), it is checked if m is an odd or even number (S5). Since it is checked in FIG. 6 if m is an odd number, if m is an even number, the flow advances along NO, and it is then checked if n is an odd number (S6). If n is an even number, data is converted in accordance with a formula in step S7; if n is an odd number, data is converted in accordance with a formula in step S8.

On the other hand, if m is an odd number, YES is determined in step S5. Similarly, it is checked if n is an odd number (S9). If n is an even number, data is converted in accordance with a formula in step S10; if n is an odd number, data is converted in accordance with a formula in step S11.

In this manner, different conversion formulas are used depending on whether m and n are even or odd numbers, and data DAT (m, n) in the m-th row and n-th column is determined by one of four conversion formulas, as shown in FIG. 6. As a result, 100×100 data in two-dimensional data are enlarged to ×2 in both the X- and Y-axis directions.

Of course, the above-mentioned processing can be appropriately changed depending on the magnification or the number of pixels, and the present invention is not limited to the above-mentioned processing method.

The preferred arrangement of the backlight 2 and the reading light source 4 shown in FIG. 2 will be explained below.

Figure 8:
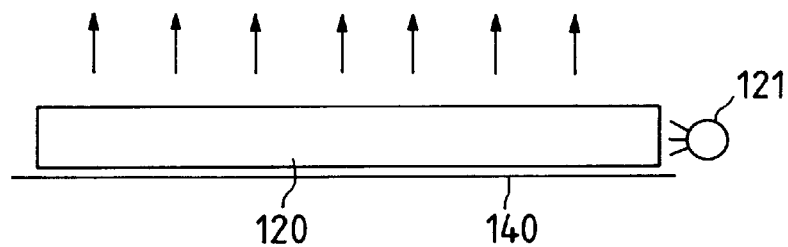
FIGS. 8 and 9 are sectional views for explaining an illumination device (light source) which can be applied to an image input/output apparatus of the present invention.

FIG. 8 is a schematic view for explaining a two-dimensional illumination device which can be applied to this embodiment. The illumination device shown in FIG. 8 comprises a light guide plate 120 such as an acrylic plate, a light source 121 such as a fluorescent lamp, and a reflection plate 140.

Light emitted by the light source 121 is incident into the light guide plate 120. The light incident into the light guide plate 120 propagates while being reflected by the inner surfaces of the light guide plate 120, and also emerges from the light guide plate 120. The light components emerging from the light guide member 120 and irradiated onto an object to be illuminated are effectively used, but light components emerging in other directions do not serve as effective light. Thus, as shown in FIG. 8, the reflection plate 140 is preferably disposed on the surface, opposite to the object to be illuminated, of the light guide plate. With this structure, the light is reflected by the reflection plate 140, and illuminates the object to be illuminated via the light guide plate 120.

The reflection plate 140 is not always necessary. For example, if the surface on which the light guide plate 120 is disposed (in this embodiment, the surface of the partition portion 5) sufficiently contributes to light reflection (e.g., a white surface or a high-luminance surface), the reflection plate 140 may be omitted.

On the other hand, the reflection plate 140 may be directly formed on the surface, opposite to the object to be illuminated, of the light guide plate 120.

The position of the light source 121 such as a fluorescent lamp is not limited to one side, as shown in FIG. 8. For example, the light source 121 may also be arranged on the opposite side, or may be arranged in correspondence with all the four sides. In place of the fluorescent lamp, a large number of LEDs may be arranged, or LED chips may be arranged on the surface of the light guide plate.

Figure 9:
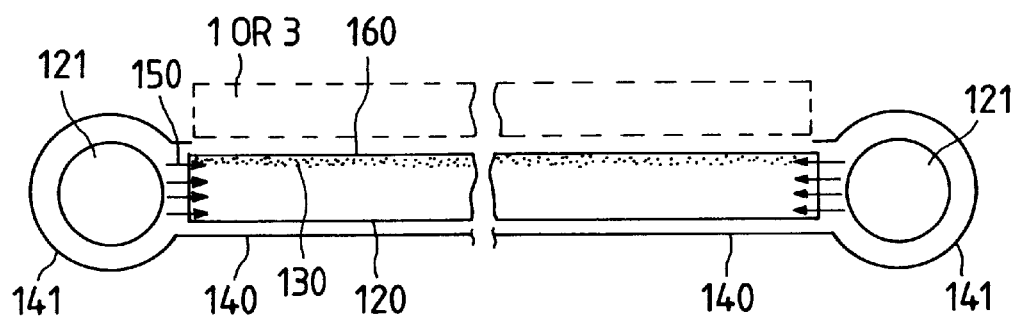

FIG. 9 is a sectional view for explaining the preferred arrangement of the light source as an embodiment of the surface light source shown in FIG. 8.

In FIG. 9, light sources 121 such as fluorescent lamps are disposed on two sides (or four sides) of the light guide plate 120. Reflectors 141 are arranged around the light sources 121, so that light emitted by the light sources 121 can be effectively used. Note that the image output unit 1 or the image input unit 3 as the object to be illuminated is disposed, as indicated by broken lines in FIG. 9.

FIG. 9 shows an example wherein a light exit surface 160 of the light guide plate 120 has a light diffusion region 130. With this structure, emerging light can become a further uniform one. The light diffusion region 130 may be formed in the light guide plate 120 or may be realized using another sheet. The light diffusion region 130 can be formed by changing the composition of materials or using a material containing particles for diffusion or particles of a material with a different refractive index.

As described in detail above, in this embodiment, since the image output unit is disposed on one surface side, and the image input unit is disposed on the opposite surface side, a desired portion of an original can be easily input.

As described above, even when the apparatus has a loupe function of displaying an image such as a character on an original in an enlarged scale, a desired portion can be easily displayed in an enlarged scale.

In addition, since the image input unit and the image output unit are disposed on the opposite surfaces, a compact and portable image input/output apparatus can be realized.

Furthermore, since special-purpose light sources are provided to the image input unit and the image output unit, optimal illumination suitable for reading and display characteristics can be realized.

[Second Embodiment]

Figure 10:
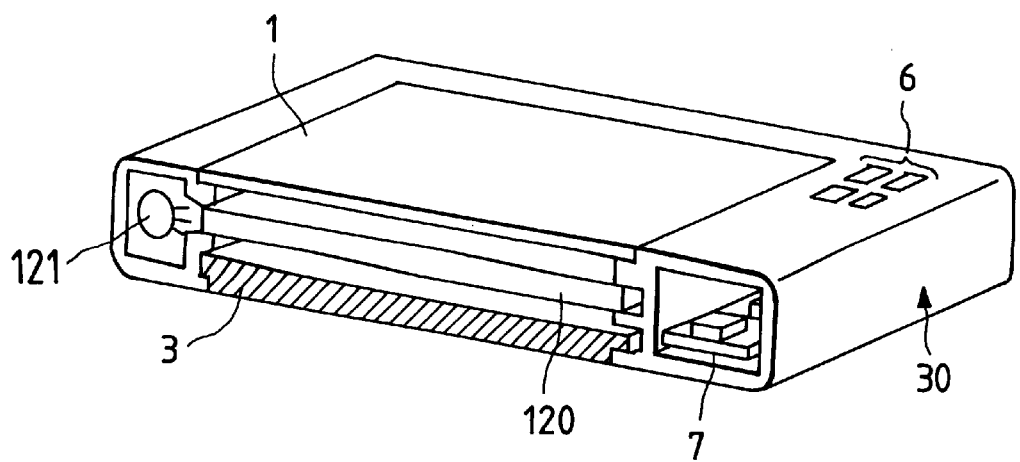

FIG. 10 is a partially cutaway perspective view showing an image input/output apparatus according to another embodiment of the present invention.

In an image input/output apparatus 30 of this embodiment, neither the reading light source nor the backlight are provided to an image input unit 3 and an image output unit 1. In this embodiment, an illumination device common to the image input unit 3 and the image output unit 1 is used.

More specifically, in this embodiment, a light source 121 such as a fluorescent lamp and a light guide plate 120 are arranged, and light emitted by the light source 121 is guided via the light guide plate 120, as described above. In this case, light emerging from one surface of the light guide plate 120 is used for the image input unit, and light emerging from the other surface of the light guide plate 120 is used for the image output unit.

However, since light emerging for the image input unit is reflected by the surface of an original such as paper, some light components can be used as illumination light for illuminating the image output unit via the light guide member.

Therefore, when no image reading operation is performed, e.g., when a stored image is displayed, the image input/output apparatus is placed on an original, if possible, on a blank sheet of paper where no character or the like is written, thus obtaining a brighter displayed image.

The dual-surface light source 121 is not limited to that of this embodiment. For example, EL or LED light sources, which can attain a low-profile structure and can illuminate two surfaces, may be two-dimensionally arranged.

Also, various other arrangements may be available. For example, LEDs may be arranged on the two surfaces of a board or may be arranged on one surface of a transparent substrate.

Since the operation of this embodiment is substantially the same as that described in the first embodiment, a detailed description thereof will be omitted.

As described above, since this embodiment uses a light source common to the image input unit and the image output unit, a further size reduction can be realized. Since a common light source is used, consumption power can be saved, and the capacity of a battery and the size of a power supply circuit can be reduced, thus contributing to size reductions of the entire apparatus. If the battery capacity remains the same, size reductions of the circuit and the light source can be realized, or the apparatus can be driven for a longer period of time.

[Third Embodiment]

A preferred embodiment of an image input unit that can be utilized in the present invention will be described below with reference to the accompanying drawings.

Figure 11:
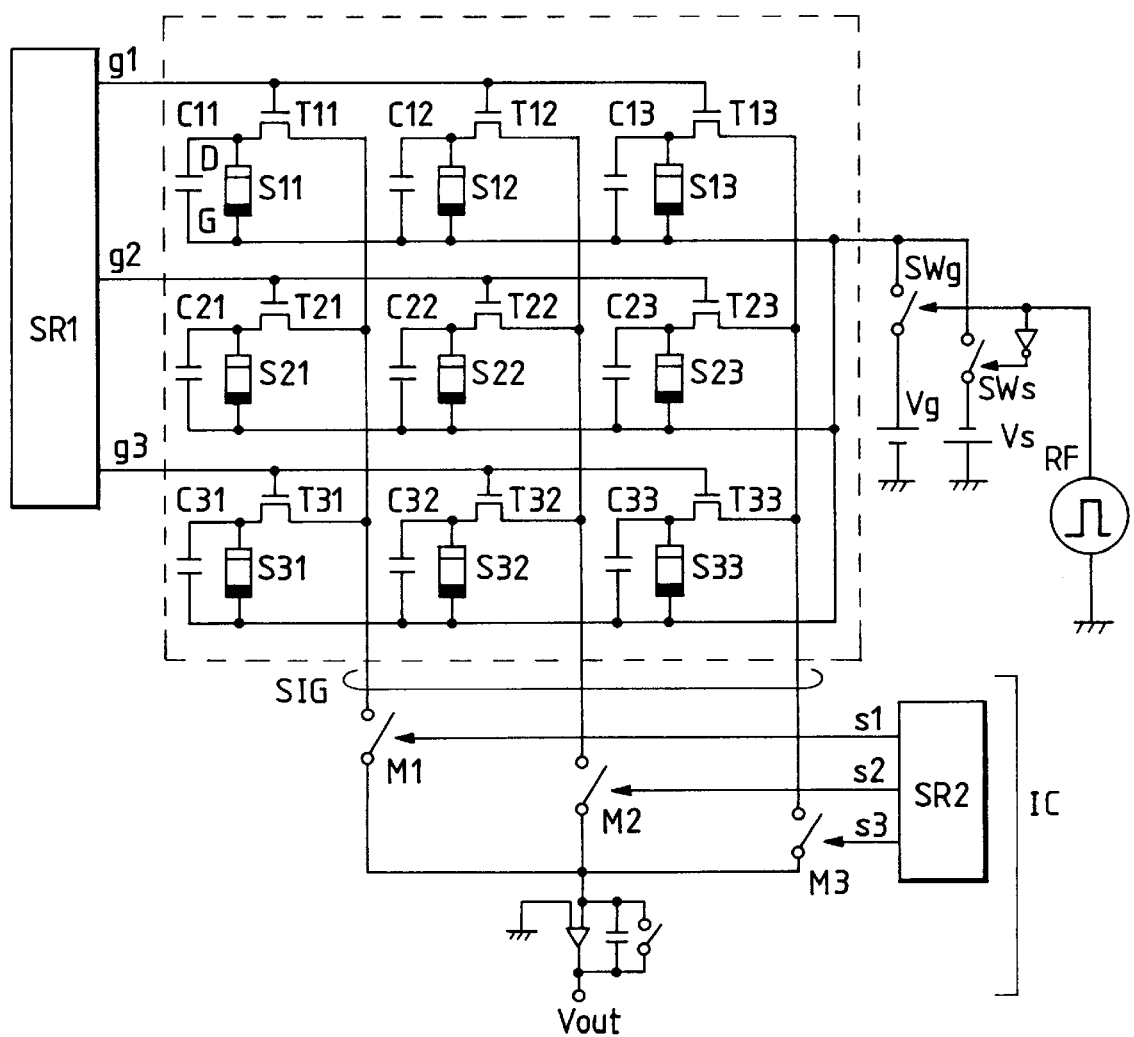
FIG. 11 is a schematic circuit diagram of an image input unit which can be applied to the present invention.
Figure 12A:
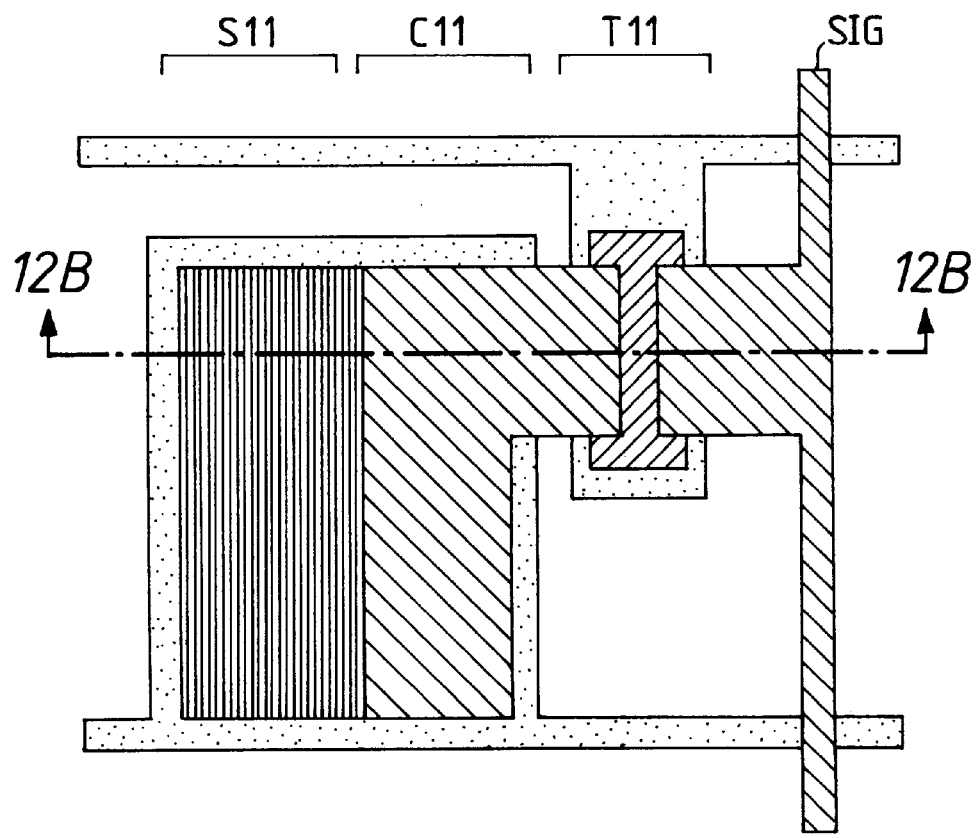
FIG. 12A is a plan view for explaining one preferred arrangement of one pixel in an image input unit of the present invention.
Figure 12B:
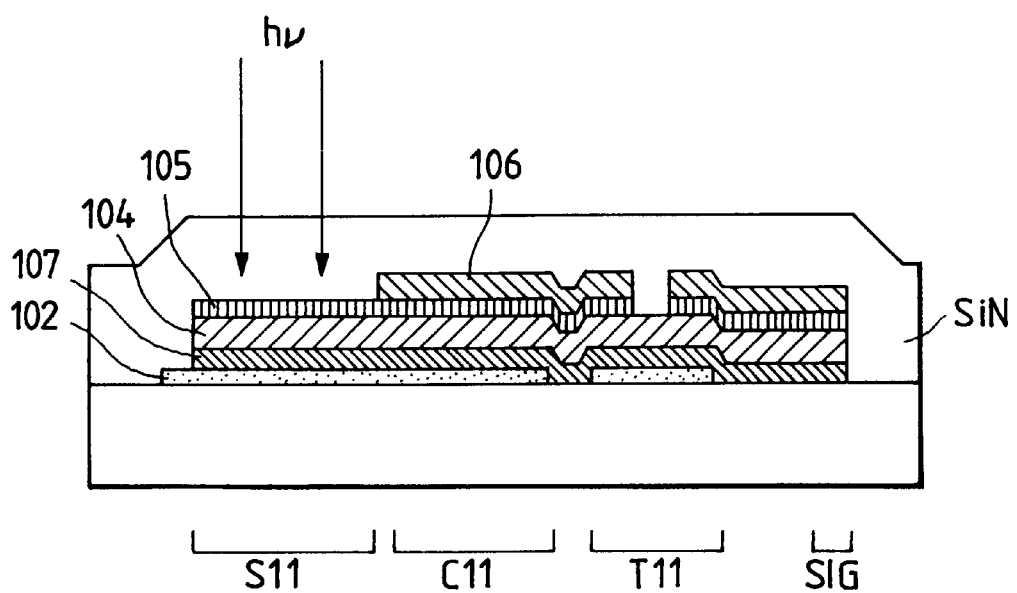
FIG. 12B is a sectional view of the pixel in the image input unit taken along a line 12B—12B in FIG. 12A.

FIG. 11 is a schematic circuit diagram of an image input unit which can be applied to the image input/output apparatus of the present invention, FIG. 12A is a plan view of elements constituting one pixel in the image input unit, and FIG. 12B is a sectional view taken along a line 12B—12B in FIG. 12A. The circuit shown in FIG. 11 includes photoelectric conversion elements S11 to S33 each having a lower electrode G and an upper electrode D. The circuit shown in FIG. 11 also includes capacitors C11 to C33, and transfer TFTs (thin film transistors) T11 to T33. A reading power supply Vs and a refresh power supply Vg are connected to the G electrodes of the photoelectric conversion elements S11 to S33 via switches SWs and SWg, respectively. The switch SWs is connected to a refresh control circuit RF via an inverter, and the switch SWg is directly connected to the circuit RF. During the refresh period, the switch SWg is turned on, and during other periods, the switch SWs is turned on. One pixel is constituted by a photoelectric conversion element, a capacitor, and a TFT, and the signal output of the circuit for one pixel is connected to a detection integrated circuit IC via a signal wiring line SIG.

A reading signal is input to an amplifier via switches M1 to M3 which are turned on/off by a signal from a shift register SR2 in the detection integrated circuit IC via control wiring lines s1 to s3, and is finally output from a terminal Vout.

A shift register SR1 is connected to control wiring lines g1 to g3, which are connected to the gate lines of the TFTs T11 to T13.

In a photoelectric conversion device of this embodiment, a total of nine pixels are divided into three blocks, outputs from three pixels of each block are simultaneously transferred, and these outputs are sequentially converted into the detection integrated circuit into output signals via the signal wiring lines. Then, the output signals are output. In FIG. 11, the pixels are two-dimensionally arranged by arranging three pixels in one block in the horizontal direction in FIG. 11 and arranging the three blocks in turn in the vertical direction in FIG. 11.

Figure 13:
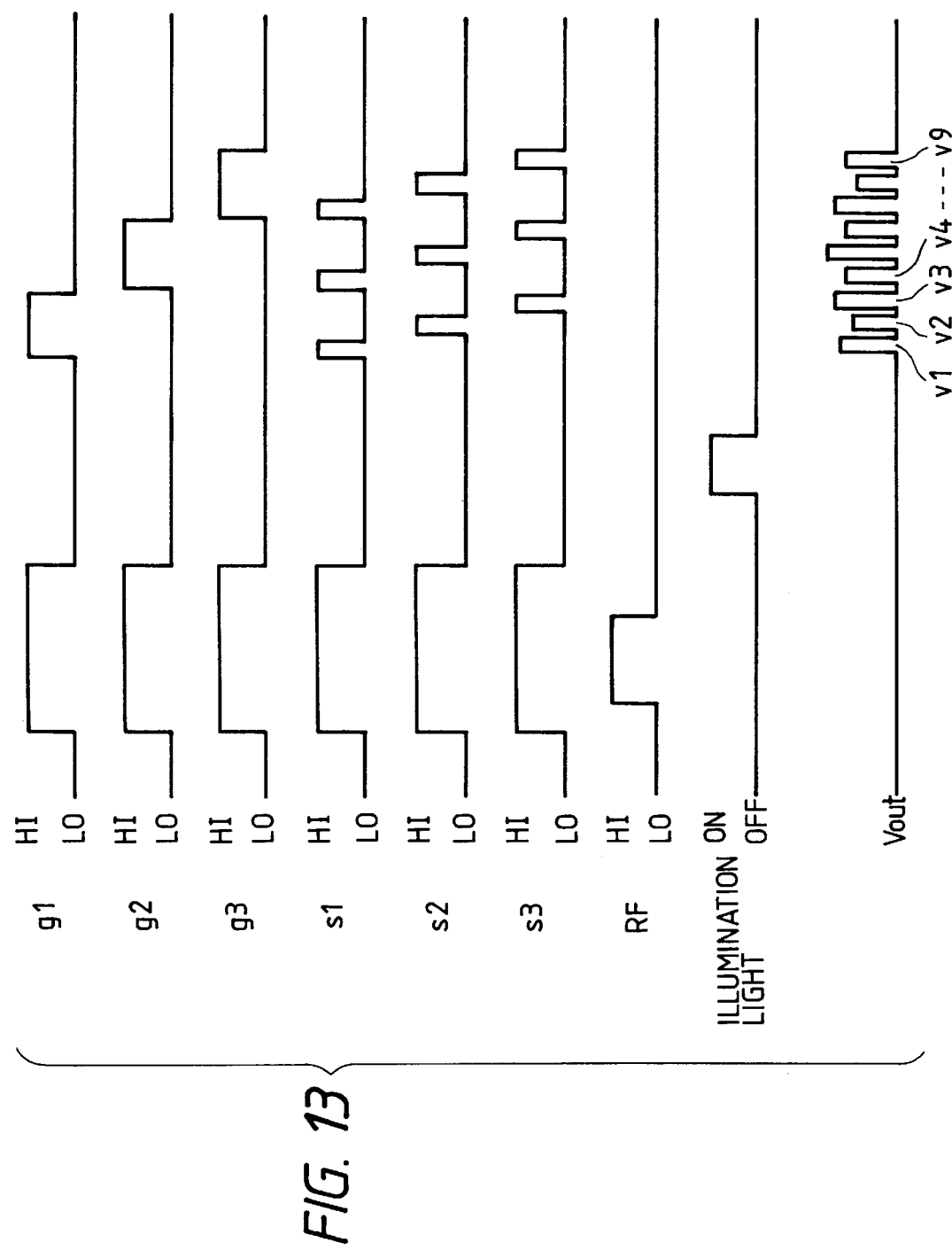
FIG. 13 is a timing chart for explaining one preferred operation of the image input unit of the present invention.

The operation of the photoelectric conversion device of this embodiment will be exemplified below with reference to FIGS. 11 and 13. FIG. 13 is a timing chart for explaining the operation of this embodiment.

The shift registers SR1 and SR2 apply Hi signals to the control wiring lines g1 to g3 and s1 to s3. In response to these signals, the transfer TFTs T11 to T33 and switches M1 to M3 are turned on and are electrically connected to each other, and the D electrodes of all the photoelectric conversion elements S11 to S33 are set at the GND potential (since the input terminal of an integration detector Amp is designed to be the GND potential). At the same time, the refresh control circuit RF outputs a Hi signal to turn on the switch SWg, and the G electrodes of all the photoelectric conversion elements S11 to S33 are set at a positive potential by the refresh power supply Vg. All the photoelectric conversion elements S11 to S33 are set in the refresh mode, and are refreshed. Then, the refresh control circuit RF outputs a Lo signal to turn on the switch SWs, and the G electrodes of all the photoelectric conversion elements S11 to S33 are set at a negative potential by the reading power supply Vs. All the photoelectric conversion elements S11 to S33 are set in the photoelectric conversion mode, and at the same time, the capacitors C11 to C33 are initialized.

In this state, the shift registers SR1 and SR2 apply Lo signals to the control wiring lines g1 to g3 and s1 to s3. In response to these signals, the transfer TFTs T11 to T33 and the switches M1 to M3 are turned off, and the D electrodes of all the photoelectric conversion elements S11 to S33 become open in a DC manner. However, the potentials are held by the capacitors C11 to C13.

However, since no illumination light is incident at this time, no light is incident on the photoelectric conversion elements S11 to S33, and no photocurrents flow. In this state, if illumination light is output as light pulses or continuous light, and is irradiated onto an original, light reflected by the original is incident on the photoelectric conversion elements S11 to S33. This light includes information of an image on the original. Photocurrents which flow in response to this light are stored in the capacitors C11 to C33 as charges, and are held after the irradiation of the incident light.

The shift register SR1 applies Hi control pulses to the control wiring line g1, and signals v1 to v3 are sequentially output via the transfer TFTs T11 to T13 and the switches M1 to M3 in response to control pulses applied from the shift register SR2 to the control wiring lines s1 to s3. Similarly, other optical signals are output under the control of the shift registers SR1 and SR2. Thus, the two-dimensional information on the original is obtained as signals v1 to v9. A still image can be obtained by the above-mentioned operation. In order to obtain dynamic image information, the above-mentioned operation is repeated.

A portion surrounded by a broken line in FIG. 11 is formed on a single large-area insulating substrate. FIG. 12A is a plan view of a portion corresponding to the first pixel in the portion surrounded by the broken line in FIG. 11. The pixel shown in FIG. 12A includes the photoelectric conversion element S11, the TFT T11, the capacitor C11, and the signal wiring line SIG. In this embodiment, the capacitor C11 and the photoelectric conversion element S11 are not independently element-isolated, and the capacitor C11 is simultaneously (integrally) formed by increasing the area of the electrode of the photoelectric conversion element S11. This structure can be realized since the photoelectric conversion element and the capacitor have the same layer structure.

FIG. 12B is a sectional view taken along a broken line 12B—12B in FIG. 12A.

As shown in FIG. 12B, a passivation silicon nitride film SiN is formed on the upper portion of the pixel.

Note that the silicon nitride film need not always have a stoichiometric composition. Also, other films such as a silicon oxide film, a silicon carbide film, and the like may be used as long as they can be used as a passivation film.

The structure shown in FIG. 12B includes a lower electrode 102 consisting of, e.g., Cr, an insulating layer 107 consisting of, e.g., SiN, an i-type photoelectric conversion semiconductor layer 104, an n-type hole injection prevention layer 105, and an upper electrode 106.

The i-type photoelectric conversion semiconductor layer 104 preferably consists of amorphous silicon containing hydrogen. However, other semiconductor materials such as amorphous silicon containing a crystallite material, crystallite silicon, polycrystalline silicon, and the like may be used as long as they can constitute a TFT. Furthermore, these semiconductor materials preferably contain hydrogen atoms. Alternatively, semiconductor materials may contain halogen atoms or both hydrogen and halogen atoms.

In FIG. 12B, original illumination light is irradiated from the rear surface side (the lower side in FIG. 12B) of the photoelectric conversion element portion onto an original, and light reflected by the original is incident on the photoelectric conversion element.

The operation of this embodiment will be described below with reference to FIG. 12B. In the refresh mode, an electric field is applied to guide holes from the semiconductor layer 104 toward the upper electrode 106. In the photoelectric conversion mode, an electric field is applied to cause holes generated in the semiconductor layer 104 to stay therein and to guide electrons toward the upper electrode 106. In this photoelectric conversion mode, the holes stored in the semiconductor layer 104 or the electrons guided to the upper electrode side are detected.

In this embodiment, since the G electrodes of the photoelectric conversion elements are connected to common wiring lines, and the common wiring lines are controlled to be at the potentials of the refresh power supply Vg and the reading power supply Vs via the switches SWs and SWg, all the photoelectric conversion elements can be simultaneously switched between the refresh mode and the photoelectric conversion mode. For this reason, optical outputs can be obtained using one TFT per pixel without requiring any complicated control.

In this embodiment, nine pixels are two-dimensionally disposed in a 3×3 matrix, and the image pickup and display operations are attained by simultaneously driving three pixels each at three time-divisional timings. However, the present invention is not limited to this arrangement. For example, 2,000×2,000 pixels may be two-dimensionally disposed at a density of 5×5 pixels per 1-mm$^2$ area, thus realizing a 40 cm×40 cm image input unit.

Figure 14:
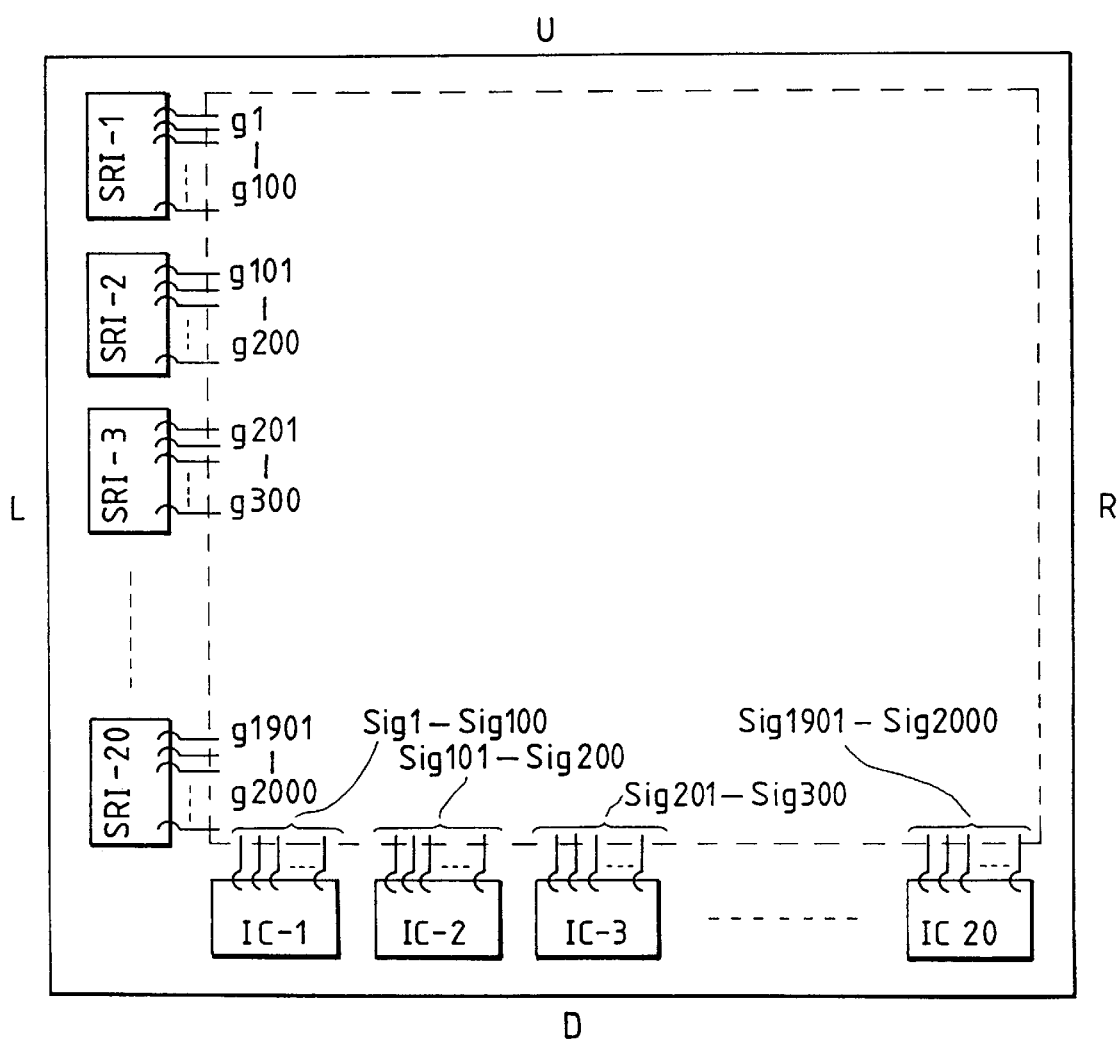
FIGS. 14 and 15 are plan views for explaining the mounting states of the image input unit of the present invention.
Figure 15:
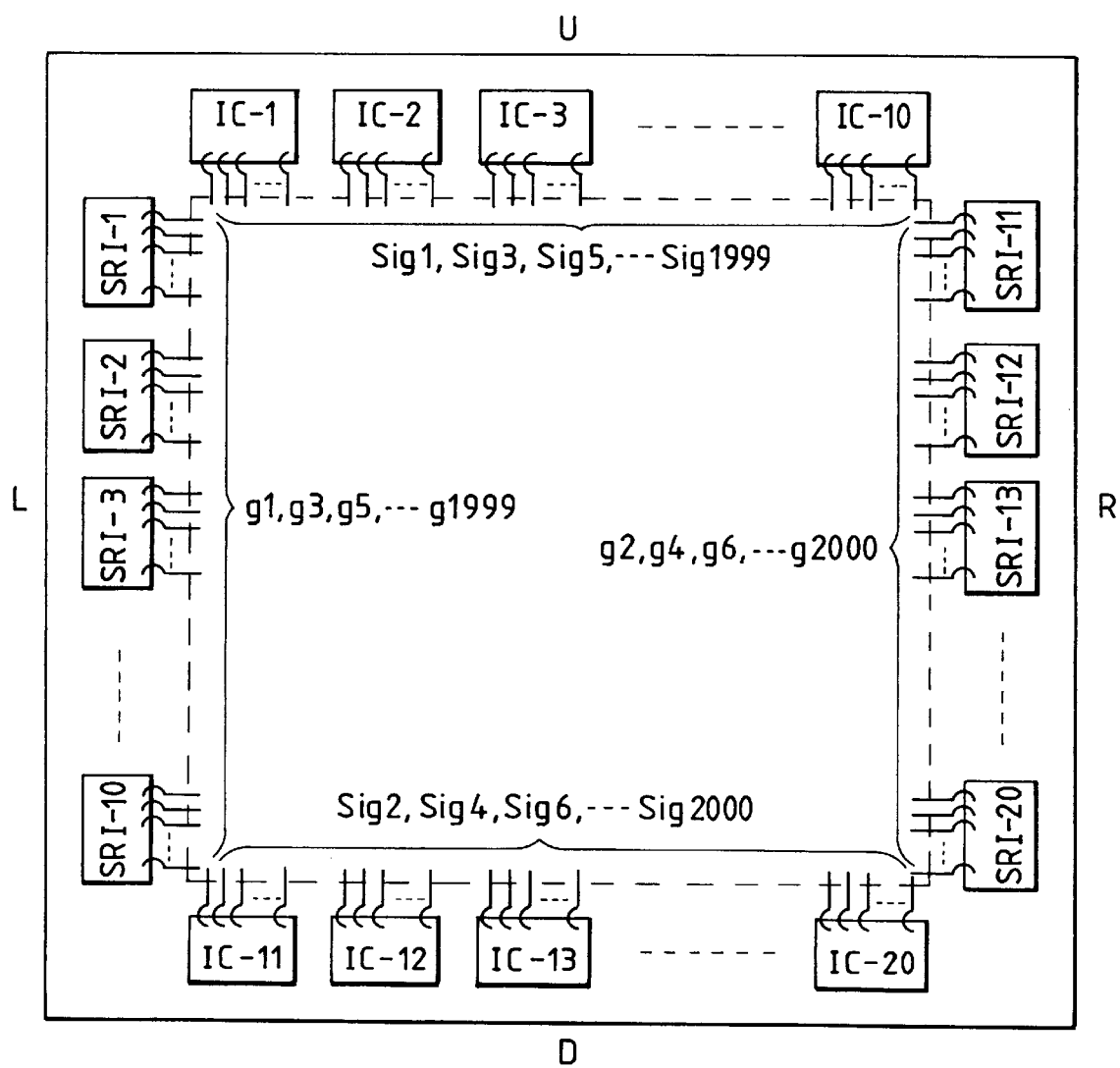

FIGS. 14 and 15 show the mounting states of an image input unit having 2,000×2,000 pixels. For example, when an image input unit having 2,000×2,000 pixels is to be realized, the number of elements surrounded by the broken line in FIG. 11 need only be increased in both the vertical and horizontal directions. In this case, the number of control wiring lines is increased to 2,000 (lines g1 to g2000), and the number of signal wiring lines SIG is also increased to 2,000 (lines sig1 to sig2000). The shift register SR1 and the detection integrated circuit IC must have a large scale since they must perform control and processing of 2,000 lines. If the shift register and the integrated circuit are realized by one-chip elements, the scale of one chip becomes very large, and such an element is disadvantageous in terms of yield and cost in the manufacture. Thus, as the shift register SR1, one chip is formed per 100 stages, and a total of 20 shift registers (SR1-1 to SR1-20) are used. Also, as the detection integrated circuit, one chip is formed per 100 processing circuits, and a total of 20 integrated circuits (IC1 to IC20) are used.

In FIG. 14, 20 chips (SR1-1 to SR1-20) are mounted at the left side (L), 20 chips are mounted at the lower side (D), and 100 control wiring lines and 100 signal lines per chip are connected to each chip by wire bonding. A portion surrounded by a broken line in FIG. 14 corresponds to the portion surrounded by the broken line in FIG. 11. Also, connections to an external circuit are not shown in FIG. 14. Furthermore, the elements SWg, SWs, Vg, Vs, RF, and the like are not shown in FIG. 14. Twenty outputs (Vout) are obtained from the detection integrated circuits IC1 to IC20. These outputs may be connected to a single line via a switch or the like, or the 20 outputs may be directly output and may be subjected to parallel processing.

FIG. 15 shows another embodiment. In FIG. 15, 10 chips (SR1-1 to SR1-10) are mounted at the left side (L), 10 chips (SR1-11 to SR1-20) are mounted at the right side (R), 10 chips (IC1 to IC10) are mounted at the upper side (U), and 10 chips (IC11 to IC20) are mounted at the lower side (D). In this arrangement, since 1,000 wiring lines each are distributed to the upper, lower, left, and right sides (U, D, L, R), the wiring density of each side is further reduced, and the wire bonding density of each side is also reduced, thus further improving the yield. The wiring lines are distributed in such a manner that lines g1, g3, g5, . . . , g1999 are distributed to the left side (L), and lines g2, g4, g6, . . . , g2000 are distributed to the right side (R). That is, the odd-numbered control lines are distributed to the left side (L), and even-numbered control lines are distributed to the right side (R). With this arrangement, since the wiring lines are extended and connected at equal intervals, the wiring lines can be prevented from being concentrated at high density, thus further improving the yield. Similarly, the odd- and even-numbered wiring lines can be similarly distributed to the upper side (U) and the lower side (D). Although not shown, as still another embodiment, the wiring lines may be distributed in such a manner that lines g1 to g100, g201 to g300, . . . , g1801 to g1900 are distributed to the left side (L), and lines g101 to g200, g301 to g400, . . . , g1901 to g2000 are distributed to the right side (R). More specifically, continuous control lines may be distributed to each chip, and sets of continuous control lines are alternately distributed to the left and right sides (L, R). With this arrangement, one chip can be continuously controlled, and the driving timings of the apparatus can be easily determined. In addition, since the circuit need not be made complicated, IC chips with lower cost can be used. Similarly, the wiring lines can be continuously distributed in units of chips to the upper side (U) and the lower side (D), and a circuit with lower cost can be used since continuous processing can be realized.

In both FIGS. 14 and 15, after the circuit surrounded by the broken line is formed on a single board, chips may be mounted on the board, or a circuit board corresponding to the portion surrounded by the broken line and chips may be mounted on another large board. Alternatively, chips may be mounted on a flexible board, and the flexible board may be adhered and connected to the circuit board corresponding to the portion surrounded by the broken line.

It is difficult to manufacture a large-area image input unit having a very large number of pixels in complex processes using conventional photosensors. However, the number of manufacturing processes for the image input unit according to the present invention is small since the respective elements can be simultaneously formed by utilizing common films in simple processes. Therefore, a large-area, high-performance image input unit can be manufactured with high yield and low cost. Since a capacitor and a photoelectric conversion element can be arranged in a single element, the number of elements can be halved in practice, thus further improving the yield.

Note that the photoelectric conversion element is not limited to the above arrangement. For example, the arrangement of the photoelectric conversion element can be appropriately modified as long as the element comprises a first electrode layer, an insulating layer for preventing migration of holes and electrons, a photoelectric conversion semiconductor layer, and a second electrode layer, and an injection prevention layer for preventing injection of holes into the photoelectric conversion layer is present between the second electrode layer and the photoelectric conversion layer. In the above description, the relationship between holes and electrons may be reversed. For example, the injection prevention layer may comprise a p-type layer. In this case, in the above embodiment, when other arrangement portions are constituted by reversing the application directions of the voltages and electric fields, the same operations as described above can be attained. Furthermore, the photoelectric conversion semiconductor layer need only have a photoelectric conversion function of generating electron-hole pairs upon incidence of light. The layer structure of the photoelectric conversion semiconductor layer is not limited to a single-layer structure but may be a multi-layered structure. Also, the characteristics of the photoelectric conversion semiconductor layer may continuously change.

Similarly, the TFT need only comprise a gate electrode, a gate insulating film, a semiconductor layer which can form a channel, an ohmic contact layer, and a main electrode. For example, the ohmic contact layer may comprise a p-type layer. In this case, the control voltage for the gate electrode may be inverted, and holes may be used as carriers.

Similarly, the capacitor need only comprise a lower electrode, an intermediate layer including an insulating layer, and an upper electrode. For example, even when the capacitor is not specially isolated from the photoelectric conversion element or the TFT, the capacitor may commonly use the electrode portions of the respective elements.

Furthermore, the entire portion of the insulating substrate need not consist of an insulating material. For example, an insulating material may be deposited on a conductor or a semiconductor.

Since the photoelectric conversion element itself has a function of storing a charge, an integral value of light information for a predetermined period of time can be obtained without arranging any special capacitor.

The image input/output apparatus of the present invention is not limited to one described in the above embodiment, and modifications and combinations may be made within the scope of the invention. For example, the image input/output apparatus need only comprise a two-dimensional image input unit (reading means) disposed on one surface, image processing means for processing an image input by the image input unit, and a two-dimensional image output unit (display means) disposed on the other surface as a rear surface with respect to the one surface.

Therefore, the two-dimensional image input unit (reading means) is not limited to the above-mentioned amorphous silicon image sensor which allows the manufacture of a low-cost, large-screen sensor, but may comprise a crystallite or polycrystalline silicon image sensor which allows high-speed reading, or an infrared or ultraviolet ray sensor which allows detection using infrared or ultraviolet rays as a light source.

Similarly, the two-dimensional image output unit is not limited to the liquid crystal display which allows the manufacture of a low-cost, large-screen display, but may comprise a flat-panel CRT which allows a display with higher definition, or a plasma display which allows a brighter display.

This embodiment has no recording means such as a printer. However, recording means such as a printer can be easily arranged in the image input/output apparatus of the present invention.

[Effect of the Invention]

As described in detail above, according to the present invention, an image input/output apparatus which can realize size and cost reductions can be provided.

According to the present invention, an image input/output apparatus which can read an image while confirming image information read by an image input unit or image information to be read on an original can be provided.

In addition, according to the present invention, an image input/output apparatus which can display image information read by the image input unit on the image output unit in real time can be provided.

Furthermore, according to the present invention, an image input/output apparatus which can greatly improve operability as compared to a conventional apparatus can be provided.

Moreover, according to the present invention, an image input/output apparatus which has an electronic loupe function of displaying a read image in an enlarged scale can be provided.

Furthermore, an image input/output apparatus of the present invention can realize size and cost reductions of the entire apparatus since a two-dimensional image input unit (reading means) is disposed on one surface and a two-dimensional image output unit (display means) is disposed on the other surface as a rear surface with respect to the one surface, and can be placed on an original with an image input surface facing down and an image output surface facing up and can display read image information on the image output surface as the upper surface in real time since the image input and output surfaces are different from each other, thus greatly improving operability.

Since the photoelectric conversion element in the image input unit of the present invention has the above-mentioned arrangement, the amount of incident light can be detected by only one injection prevention layer, processes can be easily optimized, the yield can be improved, and the manufacturing cost can be reduced. For these reasons, a low-cost image input unit with a high S/N ratio can be provided. Since a first electrode layer, an insulating layer, and a photoelectric conversion semiconductor layer do not utilize the tunnel effect or Schottky barrier, electrode materials can be freely selected, and the thickness of the insulating layer and other control parameters have high degrees of freedom. The photoelectric conversion element has good matching characteristics with a switch element such as a thin film field effect transistor (TFT) and/or a capacitor element to be simultaneously formed. In addition, these elements have the same film structure. For this reason, these elements can be simultaneously formed. Furthermore, since the important film structure of both the photoelectric conversion element and the TFT can be simultaneously formed in a single vacuum state, the image input unit can have a higher S/N ratio and lower cost. Since the capacitor includes an insulating layer in its intermediate layer, and can be formed with good characteristics, a high-performance image input unit which can output the integral value of optical information obtained by a plurality of photoelectric conversion elements with a simple arrangement can be formed.

What is claimed is:

1. An image input/output apparatus comprising:

a two-dimensional image input unit disposed on a first surface;

an image processing circuit for processing an image input by said image input unit;

a two-dimensional image output unit disposed on a second surface opposite to the first surface; and an illumination device disposed between said image input unit and said image output unit for producing an illumination light for use in reading an image by said image input unit and for use in an image display by said image output unit, wherein said illumination device has a light diffusion region, wherein said image input unit comprises photoelectric conversion elements arranged in a matrix, and switch means arranged adjacent to said photoelectric conversion elements for driving said photoelectric conversion elements, each of said photoelectric conversion elements comprises a first electrode layer, a first insulating layer for preventing passage of a carrier of a first conductivity type and a carrier of a second conductivity type different from the first conductivity type, a photoelectric conversion semiconductor layer, a second electrode layer, and an injection prevention layer which is formed between said second electrode layer and said photoelectric conversion semiconductor layer, disposed in opposition to said first electrode layer, to prevent injection of the carrier of the first conductivity type to said photoelectric conversion semiconductor layer, wherein, when a voltage is supplied between said first and second electrode layers, said photoelectric conversion element performs a photoelectric conversion function between said first and second electrode layers, and a function of storing a carrier generated based on the photoelectric conversion function, and said switch means comprises a gate electrode, a gate insulating film on said gate electrode, a semiconductor layer on said insulating film, an ohmic contact layer with a gap on said semiconductor layer, and an electrode on said ohmic layer.

2. An apparatus according to claim 1, further comprising storage means for storing an image input by said image input unit, or storage means for storing an image processed by said image processing circuit.

3. An apparatus according to claim 1, wherein said illumination device comprises a light and a light guide member.

4. An apparatus according to claim 1, wherein said illumination device has a light guide in which the light diffusion region is formed.

5. An apparatus according to claim 1, wherein said illumination device has a light guide, and the light diffusion region is formed from a sheet disposed on the light guide.

6. An apparatus according to claim 1, wherein said image processing circuit has a function of enlarging image data.

7. An apparatus according to claim 1, wherein each of said photoelectric conversion elements comprises a switch element for applying an electric field to the photoelectric conversion element in a direction to guide the carrier of the first conductivity type from said photoelectric conversion semiconductor layer to said second electrode layer in a refresh operation, applying an electric field to the photoelectric conversion element to cause the carrier of the first conductivity type generated in response to light incident on said photoelectric conversion semiconductor layer to stay in said photoelectric conversion semiconductor layer and to guide the carrier of the second conductivity type to said second electrode layer in a photoelectric conversion operation, and detecting the carrier of the first conductivity type stored in said photoelectric conversion semiconductor layer or the carrier of the second conductivity type guided to said second electrode layer in the photoelectric conversion operation as an optical signal, and said photoelectric conversion device is divided into a plurality of blocks, and said switch elements are operated in units of blocks to detect optical signals.

* * * * *